Patented Aug. 19, 1952

2,607,659

UNITED STATES PATENT OFFICE 2,607,659

PROCESS FOR PREPARING LEAD TITANATE PIGMENTS

Frank O. Rummery, Baltimore, Md., assignor to The Glidden Company, Cleveland, Ohio, a corporation of Ohio No Drawing. Application December 1, 1948, Serial No. 62,965

4 Claims. (Cl. 23—51)

This invention relates to an improved process for preparing pigmentary lead titanate, and relates more particularly to the use of pigmentary titanium dioxide as one of the raw materials used in said process.

Heretofore, lead titanate ($PbTiO_3$) pigments have been made by reacting titanium dioxide (or a compound capable of yielding this oxide) with lead oxide at an elevated temperature, the conditions being such that a crude lead titanate was first formed after which the crude product was further treated to convert it to a pigmentary state. Usually such processes have involved two calcinations, the first being at a selected low temperature suitable for bringing about the formation of the crude product, and the second being at a higher temperature found suitable for developing the desired pigmentary qualities. In one of the recently issued United States patents on such a process, the patentee states that he had sought in vain for a single temperature capable of bringing about both of these ends.

I have now found that a single calcination can be employed to produce pigmentary lead titanates when the titanium dioxide which is employed as one of the reactants is already in a pigmentary state. My discovery of this and other benefits flowing from the direct use of titanium dioxide pigment makes it possible to provide a simple process for preparing lead titanate pigments.

Accordingly, it is an object of this invention to provide a process for preparing lead titanate pigment directly from titanium dioxide pigment by calcining it with lead oxide or other compound of lead which yields lead oxide during the calcination.

It is a further object to provide a process in which a single calcination may be used to prepare lead titanate pigment from titanium dioxide pigment and a lead oxide-yielding compound of lead.

It is another object to prepare a stable, light-insensitive lead titanate pigment by the direct calcination of an intimate mixture of titanium dioxide pigment with lead oxide or other reactive lead compound.

It is another object to prepare a lead titanate pigment having an excess of titanium dioxide over a monomolecular ratio thereof to lead oxide, the excess titanium dioxide being in a pigmentary condition and useful in developing durable pigmented coating compositions.

These and other objects will be apparent from the following description of the invention.

As indicated above, I have found that lead titanate ($PbTiO_3$) can be prepared directly, and in a pigmentary state of good quality, by calcining an intimate mixture of pigmentary titanium dioxide and a reactive lead compound which liberates lead oxide during the calcination. The calcination is carried out in an oxidizing, or at least non-reducing, atmosphere at a temperature below about 750° C., and preferably at temperatures between about 600° C. and 750° C. The mixture which is to be so calcined should preferably be an intimate mixture of the finely-divided ingredients. The lead oxide or reactive lead compound particles should preferably be finer than about 0.5 micron and when lead oxide is used it may be in either the rhombic or tetragonal modification. The titanium dioxide should also be in particles less than about 0.5 micron in size and may be in either the anatase modification or the rutile modification. I particularly prefer to use titanium dioxide pigment of the anatase structure in particles between about 0.15 and 0.4 micron in size. When rutile titanium dioxide pigment is used, I prefer to have the particle size between about 0.1 and 0.3 micron. The mixture of titanium dioxide pigment and lead oxide or other reactive lead compound is made up to contain at least equal molar proportions of $TiO_2$ and $PbO$ and preferably should contain at least a small excess of titanium dioxide pigment over the one-to-one ratio. I prefer a ratio of about 1.2 moles of titanium dioxide pigment to each mole of lead oxide, when pigment of the $PbTiO_3$ type is being prepared, but leaded titanium dioxide pigments may also be prepared in which the molar ratio of $TiO_2$ to $PbO$ is up to about 5 to 1 or higher.

The lead oxide should all be in the reactive state. That is, when lead oxide per se is used it should not contain metallic lead, and to ensure freedom of metallic lead, I prefer to treat the lead oxide with nitric acid, thereby converting the metallic lead to lead nitrate which is, in turn, converted to lead oxide during the calcination. Lead compounds which yield lead oxide during calcination may be similarly or otherwise treated to ensure the provision of lead oxide free of metallic lead.

By having all the lead oxide in a reactive state, and by having a small excess of titanium dioxide over the equimolar proportions, lead titanates of the $PbTiO_3$ type which are produced by the calcination are highly stable in color and quality. They are not light-sensitive (that is, do not turn dark on prolonged exposure to sunlight); and are quite stable when employed in their ultimate intended uses as pigment in a surface-coating film. Similar properties and characteristics obtain in the leaded titanium dioxide pigments. I attribute these characteristics and properties, at least in part, to the use of titanium dioxide pigment as one of the reactants. The titanium dioxide which reacts with the lead oxide during calcination is already in a stable crystalline modification before reaction occurs and is not required to undergo at that time as great a change in its basic crystallization to produce a stable lead titanate as would be necessary if the titanium dioxide raw material were in a form of hydrated ortho- or meta-titanic acid such as has been used in other prior methods of manufacture. Furthermore, the excess titanium dioxide is also in a stable pigmentary crystal form initially and its conversion to a pigmentary state is not a consideration which enters into the selection of the calcining temperature. In other words, by starting with titanium dioxide which is already in either of the stable forms which experience has shown to exist in pigmentary titanium dioxide, the low temperature calcination to which I subject the mixture has only to serve the function of bringing about chemical combination of the titanium dioxide and the lead oxide. In this respect my treatment differs from prior treatments where two calcinations were used since my single calcination brings the lead titanate reaction product directly to a stable crystalline structure which manifests desirable pigment characteristics. To the best of my knowledge, this result has never previously been obtained in a single calcination.

It is already known that for some ultimate uses of lead titanate pigment, it is beneficial to include minor proportions of lead sulfate. When I desire to introduce lead sulfate into a lead titanate or a leaded titanium dioxide calcination mixture, I may omit the treatment of the lead oxide with nitric acid and add sulfuric acid to the mixture in an amount sufficient to convert all of the metallic lead to lead sulfate and to convert any additionally desired amount of lead oxide to lead sulfate.

Any reactive lead compound which liberates lead oxide during the calcination may be used in place of or in combination with lead oxide per se. For instance, lead nitrate or basic lead carbonate [$2PbCO_3 \cdot Pb(OH)_2$] may be employed to provide some or all of the requisite quantity of lead oxide.

My process is illustrated by, but not restricted to, the following examples:

Example 1

111.5 pounds of high grade commercial lead oxide constituting essentially 100% PbO and having an average particle size of 0.15 micron, was mixed thoroughly in the dry state with 48 pounds of calcined anatase pigment having an average particle diameter of 0.25 micron and a tinting strength of 1300 as determined by the Reynolds Constant Volume Method. The mixture was calcined in a rotary kiln between 700° and 735° C. for one hour in an oxidizing atmosphere, and the materials reacted to form a pigmentary grade of lead titanate which was eminently suited to the manufacture of outdoor metal finishes.

Example 2

A mixed slurry was made of a pigmentary grade of rutile titanium dioxide and pure litharge so that there were present 43 pounds of $TiO_2$ and 100 pounds of PbO. The rutile pigment had a tinting strength of 1650 and an average particle diameter of 0.15 micron. The litharge contained only trace quantities of impurities and only traces of metallic lead. Its mean particle size was 0.3 micron. The slurry was treated with mixed acid containing 1.4 pounds $H_2SO_4$ and 2.0 pounds $HNO_3$, and heated moderately to convert any possible free lead to lead nitrate or lead sulfate. The slurry was dewatered, dried, and pulverized, then placed in a calciner and heated for one and one-half hours in the temperature range from 675° to 725° C. The materials were converted to a form of high quality lead titanate pigment which had high tinting strength, good color quality, and contained a small amount of lead sulfate.

Example 3

Finely ground lead nitrate was mixed thoroughly with calcined anatase pigment which had an average particle size of 0.35 micron and a tinting strength of 1300. There were present in the mixed powder 164 pounds of $Pb(NO_3)_2$ and 40 pounds of $TiO_2$. The mixture was heated in a rotary calciner for one hour between 600° and 700° C. A lead titanate pigment was formed, of high tinting strength and good color quality.

Example 4

Calcined rutile pigment having a mean particle diameter of 0.20 micron and a tinting strength of 1635 was slurried in water so that there was present 37 pounds of $TiO_2$ in 22.5 gallons of water. To this slurry was added a slurry of basic lead carbonate which contained 100 pounds of $2PbCO_3 \cdot Pb(OH)_2$ in 60 gallons of water. To this was added 12.5 pounds of a 10% solution of $H_2SO_4$. The slurry was mixed thoroughly and filtered. The moist filter cake was placed in a rotary kiln and heated in the temperature range 720°–750° C. for one hour, during which time the pigmentary titanium dioxide reacted with the basic lead carbonate and sulfuric acid to form a $PbTiO_3$–$PbSO_4$ pigment. The product was of good color and high tinting strength.

Example 5

A dry mechanical mixture was made from 75 pounds of high grade commercial lead oxide, free of metallic lead, of average particle diameter 0.15 micron, and 135 pounds of pigmentary anatase titanium dioxide of average particle diameter 0.25 micron. The tinting strength of the anatase pigment was 1300 as determined by the Reynolds constant volume method. The mixture was calcined in a rotary kiln between 700° and 735° C. for one hour in an oxidizing atmosphere. A very high quality pigment resulted.

In summary, it will be understood that in accordance with the principles of my invention, lead titanate pigment is prepared by calcining together lead oxide as one ultimate reagent, all of which is in a reactive condition, and pigmentary titanium dioxide. The proportions of titanium dioxide to lead oxide may be in a molar ratio of one to one (preferably 1.2 to one) to form $PbTiO_3$, or may be in any higher ratio to form what I term leaded titanium dioxide pigments. In the case of such higher ratios, the lead oxide becomes combined with titanium dioxide just as completely as when a 1.2 to one ratio prevails, and is equally effective in proportion to its concentration in the final product. The advantages flowing from my use of pigmentary titanium dioxide are various, as here indicated:

A. Chemical reaction between the lead oxide and titanium dioxide can be effected at low calcining temperatures (below 750° C.) to produce pigmentary lead titanate in a single direct step.

B. Any excess titanium dioxide present beyond the amount required to react with all of the lead oxide is in a stable pigmentary condition and thereby avoids the difficulties which arose in prior processes and products from incompletely calcined or non-pigmentary titanium dioxide.

C. The chemical reaction between the lead oxide and titanium dioxide goes to completion readily at the low calcining temperatures and ensures complete conversion of the lead oxide to lead titanate.

D. A simple treatment of the lead oxide with nitric acid ensures that all of the lead oxide is in a reactive state.

E. Lead titanate pigment free of lead sulfate can be produced directly, or if the presence of lead sulfate is desired, it can be incorporated without impairing the completeness of the lead titanate reaction.

Typical pigment properties of lead titanate pigments of the $PbTiO_3$ type prepared in accordance with this invention are:

Reynolds tinting strength _____ Approx. 650
Average particle size (microns) _____ 0.25–0.50
Refractive index _____ 2.7

In the foregoing description of my invention, and in the following claims, the terms "titanium dioxide pigment" and "pigmentary titanium dioxide" are synonymous and are used to identify titanium dioxide which has been completely processed so as to manifest the high-hiding pigmentary qualities which have heretofore been recognized as obtainable from rutile and anatase modifications of titanium dioxide, typical characteristics of which are as indicated here:

|  | Anatase | Rutile |
| --- | --- | --- |
| Reynolds Tinting Strength | 1,300 | 1,650 |
| Average particle diameter (microns) | 0.15–0.40 | 0.10–0.30 |
| Refractive index | 2.55 | 2.72 |

The term "lead oxide" is used in the claims in a generic sense to mean lead oxide per se, or lead oxide produced in situ from an appropriate lead compound.

The term "reactive lead oxide" is used in the same generic sense, but connotes additionally that the lead oxide is free of elemental or metallic lead and hence is all in a reactive state.

Having described my invention, what I claim is:

1. The method of preparing lead titanate pigment directly in a single calcination from pigmentary titanium dioxide and reactive lead oxide which consists of: providing an intimate mixture composed essentially of calcined, pigmentary titanium dioxide having a particle size below about 0.5 micron and reactive lead oxide having a particle size below about 0.5 micron, said mixture being free of metallic lead and being proportioned so as to have therein at least one and not more than about 1.2 mols of $TiO_2$ per mol of lead oxide; and calcining said mixture directly to lead titanate pigment by heating it between about 600° C. and 750° C. in a non-reducing to oxidizing atmosphere until all of the lead oxide has become combined chemically with the titanium dioxide and the resulting lead titanate has a particle size of desired pigmentary dimensions below about 0.5 micron.

2. The method as claimed in claim 1 wherein the pigmentary titanium dioxide is in the anatase modification and has a particle size between about 0.15 and 0.4 micron.

3. The method as claimed in claim 1 wherein said mixture includes a minor amount of lead sulfate.

4. The method as claimed in claim 1 wherein the pigmentary titanium dioxide is in the rutile modification and has a particle size between about 0.1 and 0.3 micron.

FRANK O. RUMMERY.

REFERENCES CITED

The following references are of record in the file of this patent:

UNITED STATES PATENTS

| Number | Name | Date |
| --- | --- | --- |
| 2,140,222 | Espenschied | Dec. 13, 1938 |
| 2,166,221 | Patterson | July 19, 1939 |
| 2,213,542 | Booge | Sept. 3, 1940 |
| 2,419,246 | Barton | Apr. 22, 1947 |

FOREIGN PATENTS

| Number | Country | Date |
| --- | --- | --- |
| 405,340 | Great Britain | Feb. 5, 1934 |
| 416,615 | Great Britain | Sept. 18, 1934 |
| 765,833 | France | Mar. 31, 1934 |
| 308,908 | Italy | June 20, 1933 |
| 31,005 | Norway | Aug. 16, 1920 |